(12) United States Patent
Gray et al.

(10) Patent No.: US 11,357,352 B2
(45) Date of Patent: Jun. 14, 2022

(54) TOASTER WITH STEAM SYSTEM

(71) Applicant: DUPRAY VENTURES INC., Montreal (CA)

(72) Inventors: Brent Gray, Montreal (CA); Michel Morand, Verdun (CA)

(73) Assignee: DUPRAY VENTURES INC., Montreal (CA)

( * ) Notice: Subject to any disclaimer, the term of this patent is extended or adjusted under 35 U.S.C. 154(b) by 168 days.

(21) Appl. No.: 16/753,021

(22) PCT Filed: Oct. 5, 2018

(86) PCT No.: PCT/CA2018/051263
§ 371 (c)(1),
(2) Date: Apr. 2, 2020

(87) PCT Pub. No.: WO2019/068202
PCT Pub. Date: Apr. 11, 2019

(65) Prior Publication Data
US 2020/0253411 A1    Aug. 13, 2020

Related U.S. Application Data

(60) Provisional application No. 62/568,510, filed on Oct. 5, 2017.

(51) Int. Cl.
*A47J 37/08* (2006.01)
*A47J 27/04* (2006.01)

(52) U.S. Cl.
CPC ........... *A47J 27/04* (2013.01); *A47J 37/0814* (2013.01); *A47J 37/0885* (2013.01); *A47J 2027/043* (2013.01)

(58) Field of Classification Search
CPC ............... A47J 37/0623; A47J 37/0629; A47J 37/0641; A47J 37/0664; A47J 37/075; A47J 37/08; A47J 37/0807; A47J 37/0814; A47J 37/0871; A47J 37/0878; A47J 37/0885; A47J 27/04; A47J 27/05; A47J 27/16; A47J 2027/043
USPC ........... 99/385, 387, 389–393, 401; 219/386, 219/393, 396, 399, 400, 401
See application file for complete search history.

(56) References Cited

U.S. PATENT DOCUMENTS 4,396,825 A    8/1983   Cox et al.
5,458,052 A *  10/1995  McNair .................. A47J 37/08
                                                      99/385

(Continued)

*Primary Examiner* — Hung D Nguyen
(74) *Attorney, Agent, or Firm* — Norton Rose Fulbright Canada LLP

(57) ABSTRACT

A toaster with a steam system comprises a casing and a chassis. A slot for a bread slice is defined by the chassis. A pop-up mechanism is within the casing and supported by the chassis, the pop-up mechanism configured for supporting a bread slice received via the at least one slot, and for raising the bread slice to project partially out of the slot at an end of a toasting/steaming process. Heating element(s) in the casing are for generating toasting heat. A steam system within the casing is configured for producing steam and feeding the steam to a steam vessel in the chassis during the toasting/steaming process. A closing system has flap(s) to close the at least one slot during the toasting/steaming process, and to open the at least one slot at completion of the toasting/steaming process.

20 Claims, 12 Drawing Sheets

(56) References Cited

U.S. PATENT DOCUMENTS

| | | | |
|---|---|---|---|
| 5,528,980 A * | 6/1996 | McClean | A47J 37/0871 |
| | | | 99/385 |
| 5,642,657 A * | 7/1997 | Yeung | A47J 37/0871 |
| | | | 99/385 |
| 5,680,810 A * | 10/1997 | Sham | A47J 27/16 |
| | | | 219/385 |
| 6,100,502 A * | 8/2000 | Sham | A47J 27/04 |
| | | | 219/401 |
| 7,105,778 B1 | 9/2006 | DeLong et al. | |
| 7,250,587 B2 | 7/2007 | Ely et al. | |
| 7,351,939 B2 | 4/2008 | Boyle et al. | |
| 7,467,583 B2 | 12/2008 | Lam | |
| 2011/0185918 A1* | 8/2011 | Zhang | A47J 36/06 |
| | | | 99/391 |
| 2015/0257597 A1 | 9/2015 | Marschke et al. | |
| 2019/0024904 A1* | 1/2019 | Ueda | A47J 37/08 |
| 2019/0059627 A1* | 2/2019 | Kitatani | A47J 37/1266 |
| 2020/0346823 A1* | 11/2020 | Patel | B65D 81/18 |

\* cited by examiner

TOASTER WITH STEAM SYSTEM

CROSS-REFERENCE TO RELATED APPLICATION

The present application claims the priority of U.S. Patent Application No. 62/568,510, filed on Oct. 5, 2017 and incorporated herein by reference.

TECHNICAL FIELD

The present application relates to toasters for toasting slices of bread, and more particularly to a toaster with a steam system for steaming the bread while toasting it.

BACKGROUND OF THE ART

Toasters are commonly found in households for toasting slices of bread. In one well known configuration, toasters are specifically designed for bread slices, and have a slice tray or slice trays for toasting bread slices held vertically. Such toasters have a latch system by which the toasts are raised out of the toaster when the toasting action is completed. This configuration is known as a pop-up toaster, in contrast to toaster ovens, in which bread slices are laid flat, with the user manually introducing and withdrawing bread slices.

In parallel, some steam systems have been introduced in toasters. The steam systems produce steam that will be absorbed by the loaf of bread while being toasted. The steam system is designed to add moisture to the bread, and give it the feel of a freshly-cooked loaf. However, steam systems have been mostly in toaster ovens.

SUMMARY

It is an aim of the present disclosure to provide a toaster with a steam system that addresses issues related to the prior art.

In accordance with the present disclosure, there is provided a toaster with a steam system comprising: a casing; a chassis; at least slot for a bread slice defined at least by the chassis; a pop-up mechanism within the casing and supported by the chassis, the pop-up mechanism configured for supporting a bread slice received via the at least one slot, and for raising the bread slice to project partially out of the slot at an end of a toasting/steaming process; at least one heating element in the casing for generating toasting heat; a steam system within the casing configured for producing steam and feeding the steam to a steam vessel in the chassis during the toasting/steaming process; and a closing system having at least one flap to close the at least one slot during the toasting/steaming process, and to open the at least one slot at completion of the toasting/steaming process.

Further in accordance with the present disclosure, at least one plenum is for instance defined between the casing and the chassis with an exhaust at a top end of the casing.

Still further in accordance with the present disclosure, both of the casing and the chassis define for instance the at least one slot, the at least one plenum being in fluid communication with the at least one slot in the casing, whereby the exhaust is the at least one slot.

Still further in accordance with the present disclosure, the casing has for instance at least one double wall with an insulating space in the double wall.

Still further in accordance with the present disclosure, the casing includes for instance one tubular vertical wall defining an outer surface of the casing.

Still further in accordance with the present disclosure, the pop-up mechanism has for instance a tray configured for supporting a bread slice received via the at least one slot, and for raising the bread slice to project partially out of the slot at an end of a toasting/steaming process.

Still further in accordance with the present disclosure, the tray has for instance a central elongated member with a plurality of side arms.

Still further in accordance with the present disclosure, a carriage is for instance located outside of the casing and connected to the tray via a vertical slot, and a lever is for instance connected to the carriage and projecting out of the casing via a vertical slot in the casing.

Still further in accordance with the present disclosure, the carriage is for instance slidingly mounted to a vertical rod.

Still further in accordance with the present disclosure, the pop-up mechanism has for instance a pair of grates for each of the slots, the grates each being a wire frame pivotally mounted to the casing and brought toward one another and configured to center a bread slice in the steam vessel for the toasting/steaming process.

Still further in accordance with the present disclosure, the pair of grates are for instance biased away from one another by a spring, a downward movement of the pop-up mechanism bringing the grates toward one another.

Still further in accordance with the present disclosure, the at least one heating element is for instance a cartridge.

Still further in accordance with the present disclosure, the casing has for instance a heat shield adjacent to the cartridge adapted to direct heat toward a slice of bread.

Still further in accordance with the present disclosure, the casing has for instance a trough at a bottom thereof adapted to direct crumbs to a removable tray.

Still further in accordance with the present disclosure, the casing has for instance a pair of face plates, a top end of each face plate being curved to form a dome shape with a bread slice slot.

Still further in accordance with the present disclosure, the steam system includes for instance a steam pipe.

Still further in accordance with the present disclosure, the steam pipe has for instance an elongated water conduit conductively connected to a heating element, with openings in the water conduit.

Still further in accordance with the present disclosure, the steam system has for instance a water reservoir in fluid communication with the elongated water conduit.

Still further in accordance with the present disclosure, the water reservoir is for instance above the elongated water conduit for water to reach the elongated water conduit by gravity via another conduit extending from the reservoir to the steam pipe.

Still further in accordance with the present disclosure, a volume of the reservoir is for instance generally equal to the volume of the water conduit of the steam pipe.

Still further in accordance with the present disclosure, the reservoir is for instance removably received in a cover wall of the casing.

Still further in accordance with the present disclosure, the closing system has for instance at least one arm pivotally connecting the flap to the chassis for movement of the at least one open configuration in which the at least one flap is away from the slot in the chassis, and a closed configuration in which the at least one flap closes the slot in the chassis.

Still further in accordance with the present disclosure, the at least one flap is for instance above the slot in the chassis.

Still further in accordance with the present disclosure, the at least one arm has for instance an inverted U-shape, with vertical arm portions on opposite sides of the flap pivotally connecting the flap to opposite sides of the chassis, and with a horizontal arm portion connected to the flap.

Still further in accordance with the present disclosure, at least one spring biases for instance the at least one flap to the open configuration.

Still further in accordance with the present disclosure, the at least one spring is for instance a wire spring having a first end connected to the at least one flap and a second end connected to the chassis or to another one of the flap.

Still further in accordance with the present disclosure, the wire spring has for instance a bottom portion in a vertical path of movement of the pop-up mechanism, whereby a contact between the pop-up mechanism and the bottom portion moves the at least one flap to the closed configuration.

Still further in accordance with the present disclosure, the bottom portion is for instance at a height of at most 40% of the vertical path of movement of the pop-up mechanism.

Still further in accordance with the present disclosure, the bottom portion is for instance at a height of at most 25% of the vertical path of movement of the pop-up mechanism.

Still further in accordance with the present disclosure, the wire spring crosses for instance over itself and forms a hoop.

Still further in accordance with the present disclosure, the closing mechanism has for instance two of the flaps interconnected by the spring.

DETAILED DESCRIPTION

Figure 1:
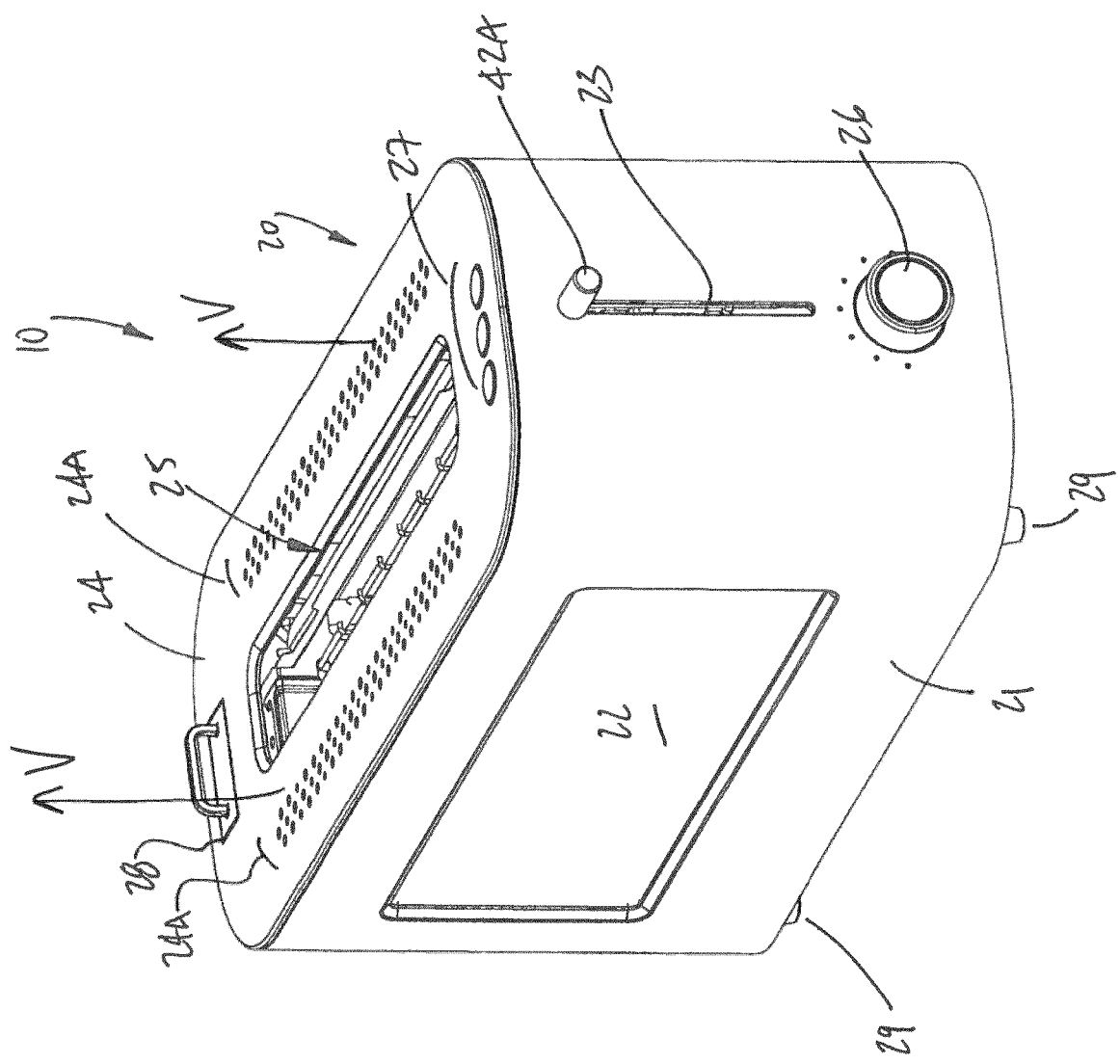
FIG. 1 is a perspective view of a toaster with a steam system in accordance with the present disclosure.

Referring to the drawings and more particularly to FIG. 1, there is illustrated at 10 a toaster with a steam system in accordance with the present disclosure. The toaster 10 is of the pop-up type holding a slice vertical or generally upright (i.e., the toaster 10 may have the slice at an angle of 45 degrees or more from the horizon), and hence has numerous components that are commonly found in pop-up toasters. The toaster 10 is also shown as being configured for a single slice to be toasted at a time, but the toaster 10 may also be constructed to toast two or more toasts at once, with separated bread slots. The toaster 10 is generally divided in the following groups: a casing 20, a chassis 30 including the heating elements, a pop-up mechanism 40, a steam system 50, and a closing system 60. This list of components should not be viewed as being exhaustive or limitative, and could include other groups, such as the electrical system and/or the electronic system, whose components are instead shown in the figures as being parts of the groups 20, 30, 40, 50 and 60, for simplicity, and as components of the electrical system and of the electronic system are distributed on the components of the other group.

The casing 20 forms the outer shell of the toaster 10. It may have any appropriate design features, as it constitutes the visible part of the toaster, and must have visual appeal.

The chassis 30 is the frame or structure of the toaster 10. It supports the various operation parts and/or moving parts of the toaster 10, such as the pop-up mechanism 40. The chassis 30 may also form part of a steaming vessel of the toaster 10.

The pop-up mechanism 40 controls the introduction of a slice of bread in the toaster 10, and pops it up when toasting is done.

The steam system 50 produces steam to moisten the bread slice prior and/or during the toasting process.

The closing system 60 automatically shuts the slice opening in the casing 20 to close the steaming vessel in the toaster 10 during the toasting process.

Referring to FIG. 1, the casing 20 is shown in a perspective view. The casing 20 may also be a housing, as a box, etc. In the illustrated embodiment, the casing 20 is shown having a single vertical wall 21, forming a generally upstanding tubular body. However, other constructions are possible, including one with a front wall, a rear wall, and side wall. A window 22 may also be defined in a front of the vertical wall 21, with a panel of transparent material, for a user to observe a slice of bread being toasted and steamed. It is also contemplated to provide windows 22 on both faces of the toaster 10. The vertical wall 21 and the window 22 are made of any appropriate materials capable of sustaining toasting and steaming temperatures, such as a glass in the case of the window 22. A vertical slit 23 may be defined in the vertical wall 21, for a lever of the pop-up mechanism 40 to exit the casing 20 for manual actuation of the toasting process.

Figure 12:
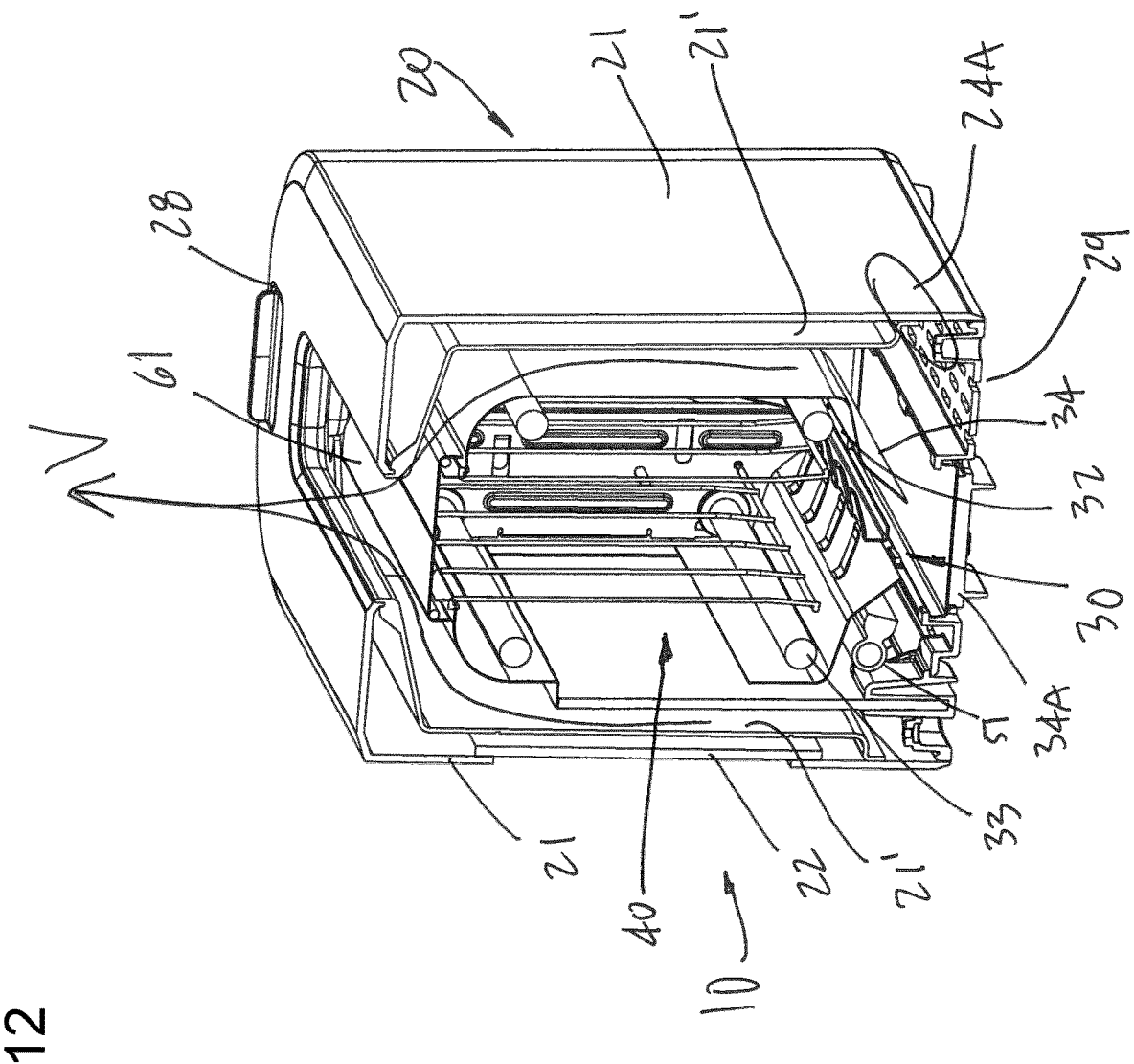
FIG. 12 is a cross-section view of the toaster with the steam system of the present disclosure, with another casing configuration.

A cover 24 is positioned on top of the vertical wall 21. The cover 24 concurrently defines the inner cavity of the toaster 10 with the vertical wall 21 and a base. The cover 24 may have a plurality of vent holes 24A, located at a top end of plenums within the toaster 10. According to an embodiment, the plenums are defined by the space between the vertical wall 21/window 22 and the casing 30, and forms air gaps to avoid heat conduction between the vertical wall 21 and the casing 30. Stated differently, the plenums act as chimneys with hot air escaping via the vent holes 24A. This is shown by arrows V in FIG. 1, with the base 29 having an inlet for air to enter the toaster 10 from the bottom, and heated air to exhaust from the vent holes 24A. Another plenum is shown in FIG. 12 and described hereinafter. The cover 24 may also have a toast slot 25, in the illustrated configuration of single toast for the toaster 10. Other slots 25 may be present in a multi-toast configuration of toaster. Components of the electrical/electronic system may also be mounted to the casing 20, to serve as interfaces for a user to adjust the toasting process. For example, knob 26 and push buttons and/or indicator lights 27 may be on the surface of the toaster 10. A water-refill opening 28 may also be formed in the casing 20—as shown on the cover 24—to feed the steam system 50 with water, as explained hereinafter. A base is also shown via its legs 29, to support the toaster 10 on the ground 10. The base may have a baseplate that supports the vertical wall 21, and other parts of the toaster 10.

Figure 2:
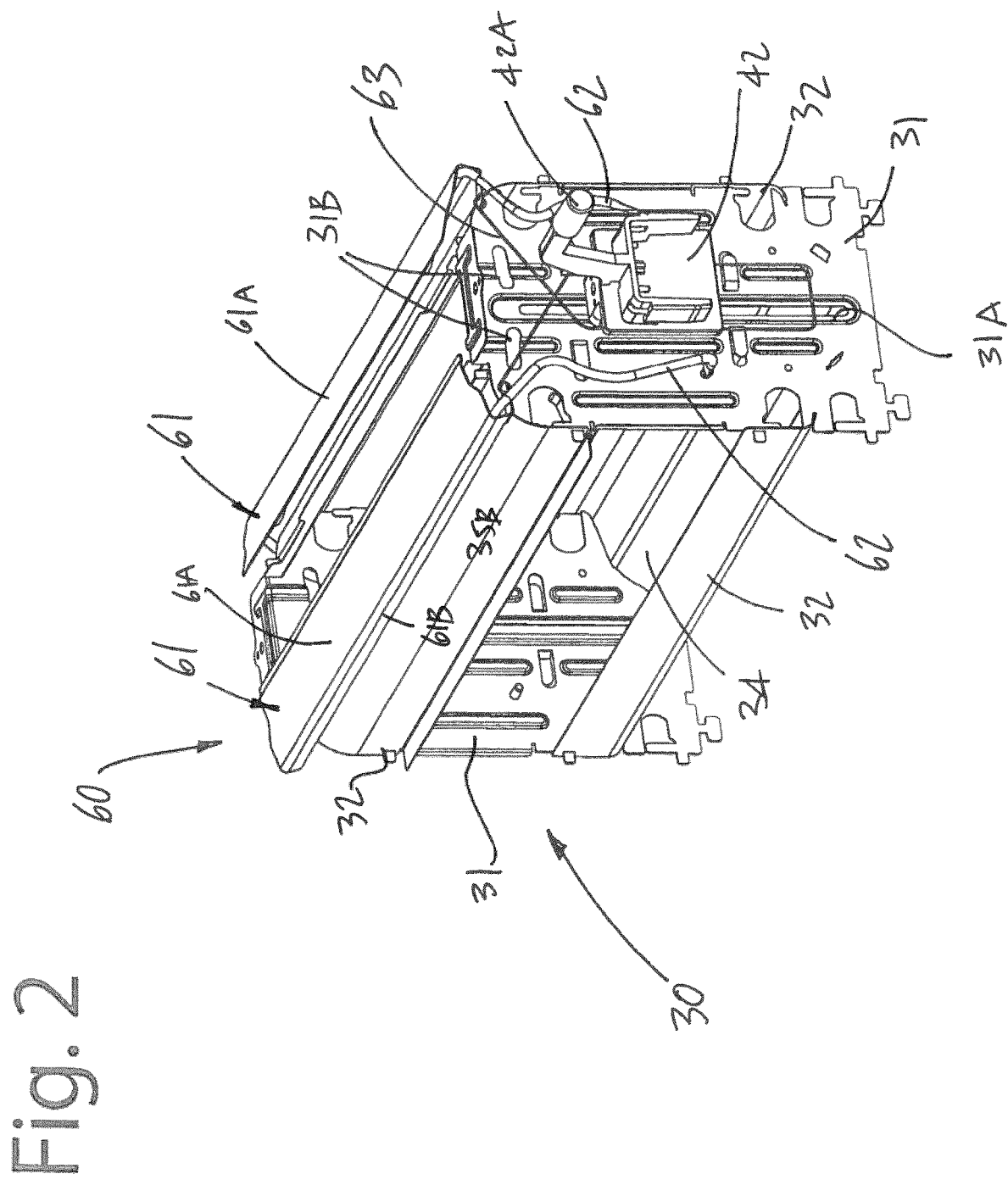
FIG. 2 is a perspective view of the toaster with the steam system of FIG. 1, with a housing removed to show a chassis and closing system in an open configuration of flaps.

Referring to FIG. 2, the chassis 30 is visible as the casing 20 and part of the pop-up mechanism 40 are removed to better expose the chassis 30. The chassis 30 serves as the structure of the toaster 10, and it supports parts of the casing 20, the pop-up mechanism 40, the steam system 50 and the closing system 60. The chassis 30 may have a pair of end plates 31. Both end plates 31 have vertical slots 31A, one of which is aligned with the vertical slit 23 (FIG. 1). The vertical slots 31A are used to guide the up and down translational movement of a tray of the pop-up mechanism 40, as explained hereinafter. A pair of guide slots 31B are also formed in each of the end plates 31, to guide a movement of toast racks known as grates, also detailed after. As an alternative to the vertical slots 31A, the chassis 30 could have a pair of posts, for a tray to be slidingly mounted to the posts.

Figure 7:
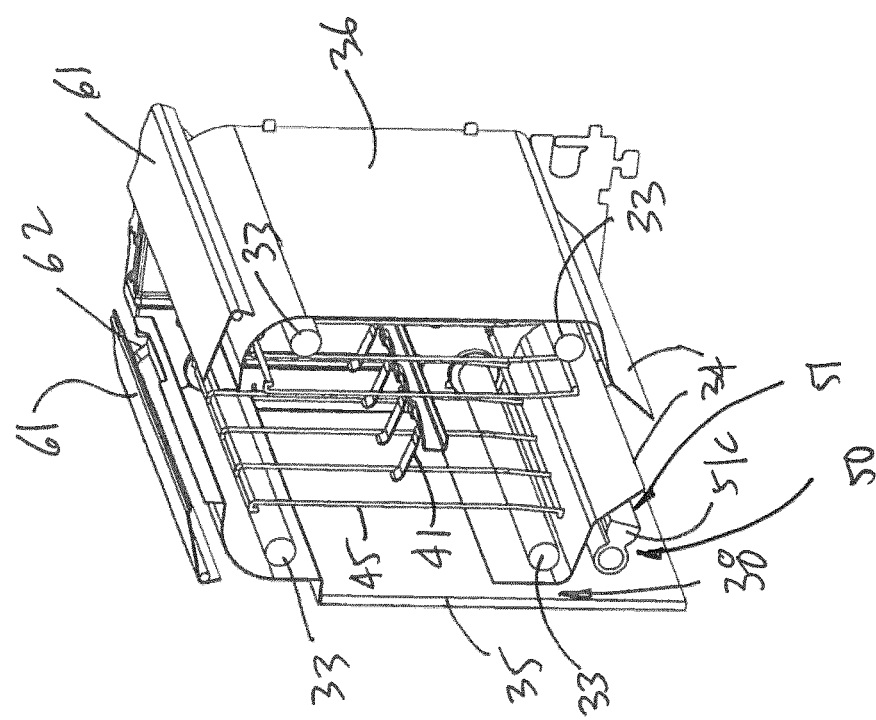
FIG. 7 is another fragmented perspective view of the toaster with the steam system of FIG. 6, showing the grates of the pop-up mechanism spaced apart.
Figure 8:
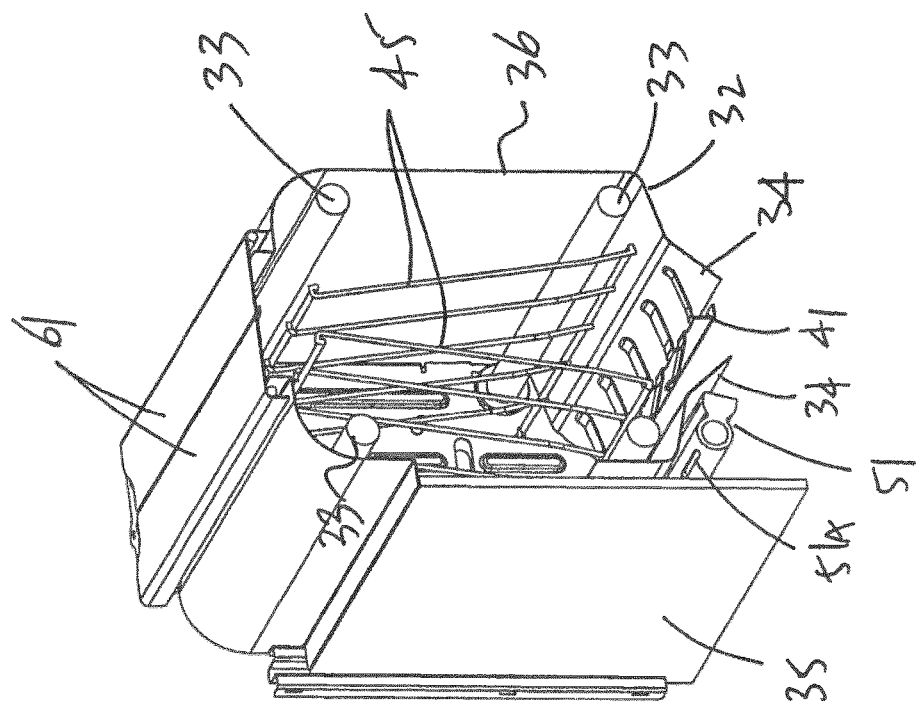
FIG. 8 is a fragmented perspective view of the toaster with the steam system of FIG. 6, showing the grates of the pop-up mechanism brought together, and flaps closed for forming a steaming vessel as used during a toasting an steaming process.
Figure 9:
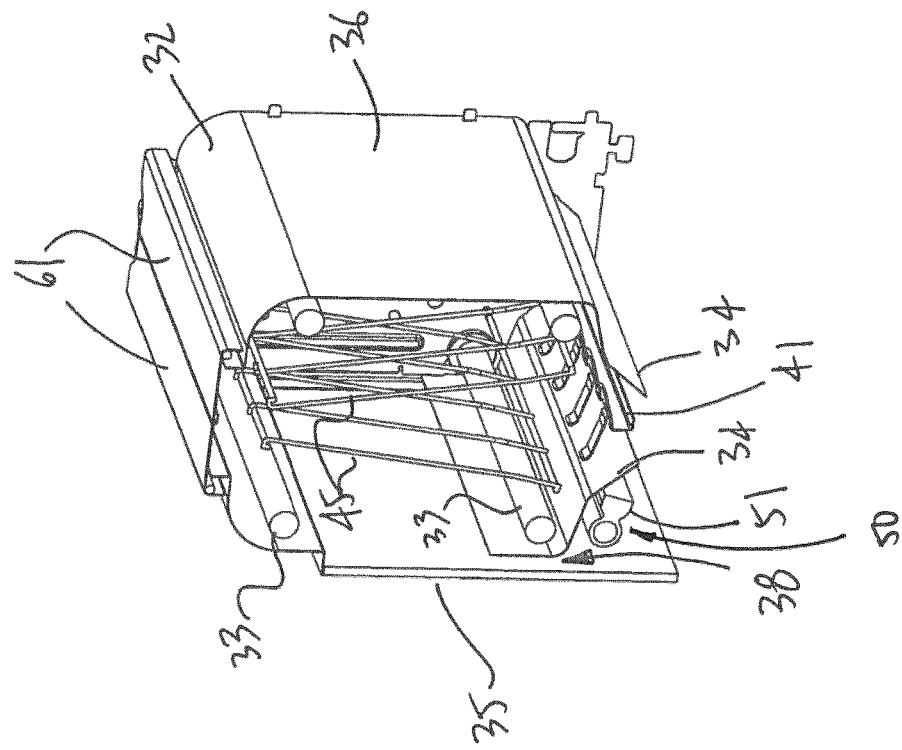
FIG. 9 is another fragmented perspective view of the toaster with the steam system of FIG. 8.

In the illustrated embodiments, the end plates 31 are interconnected by heat shields 32. The heat shields 32 may reflect heat generated by heating elements 33 of the electrical/electronic system toward the slice of bread. The heat shields 32 further shield the casing 20 from direct heat exposure. The heating elements 33 of the illustrated embodiment are elongated cylindrical cartridges as are conventionally found in toasters. The heating elements 33 may be any type of heating element, such as infrared heaters, nichrome wires or elements, etc. There are four such heating elements 33 (FIG. 4), although more or less could be present, notably if wires are present, such as in a coil arrangement. Trough plates 34 are connected to the bottom heat shields 32, and concurrently form a trough for breads crumbs to be directed to a bottom of the chassis 30. A trap 34A may be present in a bottom of the chassis 30 and accessible via the base 29 of the casing 20 to empty the toaster 10 of the crumbs. As an alternative to trough plates 34, a crumby tray could be at the bottom of the chassis 30 and extend over the full footprint of the chassis 30 to gather the crumbs. The chassis 30 may further have face plates 35 and 36, as shown in FIGS. 7 and 8, the face plates 35 and 36 forming the steaming vessel with the end plates 31 and the heat shields 32. If the casing 20 has a window 22, the face plate 35 may also be transparent, for a user to see inside the toaster 10. The face plates 35 and 36 may each have a main panel 35A (e.g., window) and 36A respectively, but with a curved top wall portion 35B and 36B. The curved top wall portions 35B and 36B may concurrently define a dome-like shape, with a toast slot between them. It is via the slot between the face plates 35 and 36 that the slice of bread enters the steaming vessel. The slot may therefore be closed prior to commencing the toasting/steaming process, for the steam to generally remain in the steaming vessel. Accordingly, in an embodiment, both the casing 20 and the chassis 30 define a toast slot (or more), with the toast slots being vertically aligned. In the embodiments of FIGS. 1 to 11, the slots of the casing 20 and of the chassis 30 are in close proximity. And may be regarded as one and the same. In the embodiment of FIG. 12, the slots are distance from one another and thus may be regarded as distinct slots. Moreover, the chassis 30 may have a pair of rails 37 to sealingly support the window 22. The space between the window 22 and the face plate 35 is one of the plenums aligned with the vent holes 24A, whereas the space between the vertical wall 21 and the face plate 36 is the other one of the plenums aligned with the vent holes 24A. As observed in FIG. 7, a gap 38 is defined between the face plate 35 and the heat shield 32, the gap 38 allowing steam to enter the steaming vessel as explained hereinafter. As an alternative to a gap of elongated shape, holes or like passages could be defined in the heat shield 32 and/or face plates 35 and 36 for steam penetration into the steaming vessel.

Figure 4:
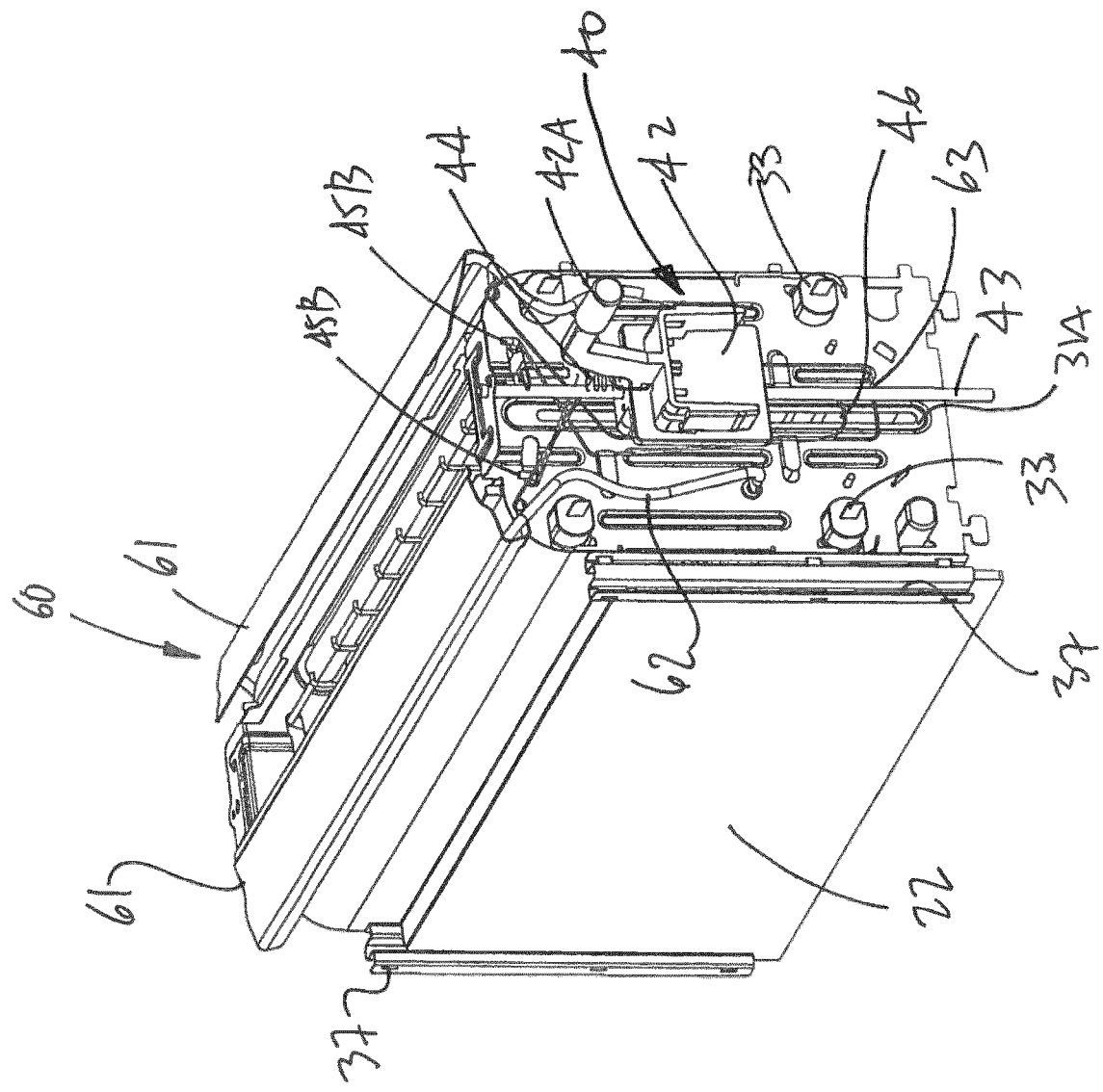
FIG. 4 is a perspective view of the toaster with the steam system of FIG. 2, showing a carriage of a pop-up mechanism in its upper position.
Figure 5:
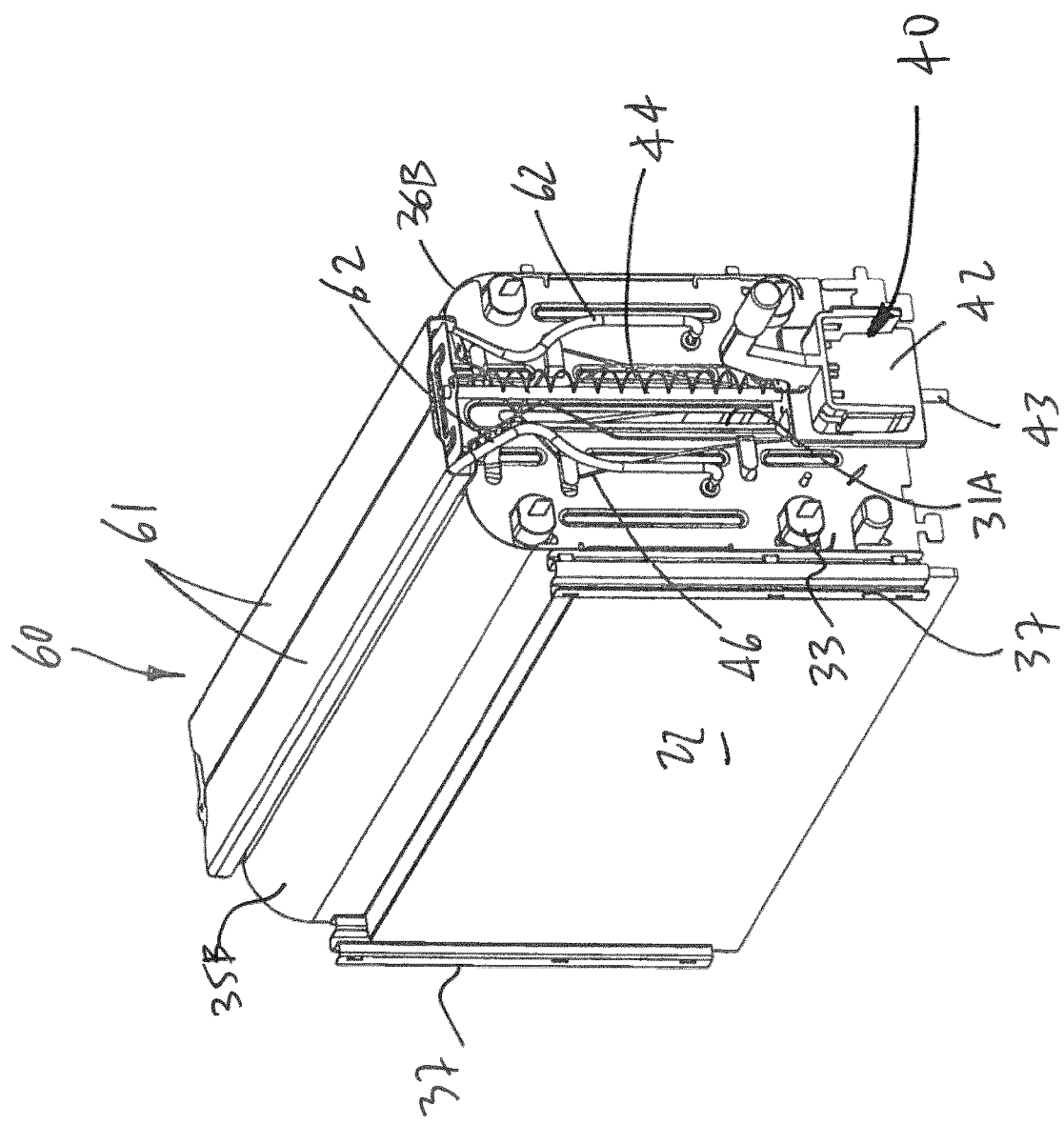
FIG. 5 is a perspective view of the toaster with the steam system of FIG. 4, showing the carriage of the pop-up mechanism in its lower position.
Figure 6:
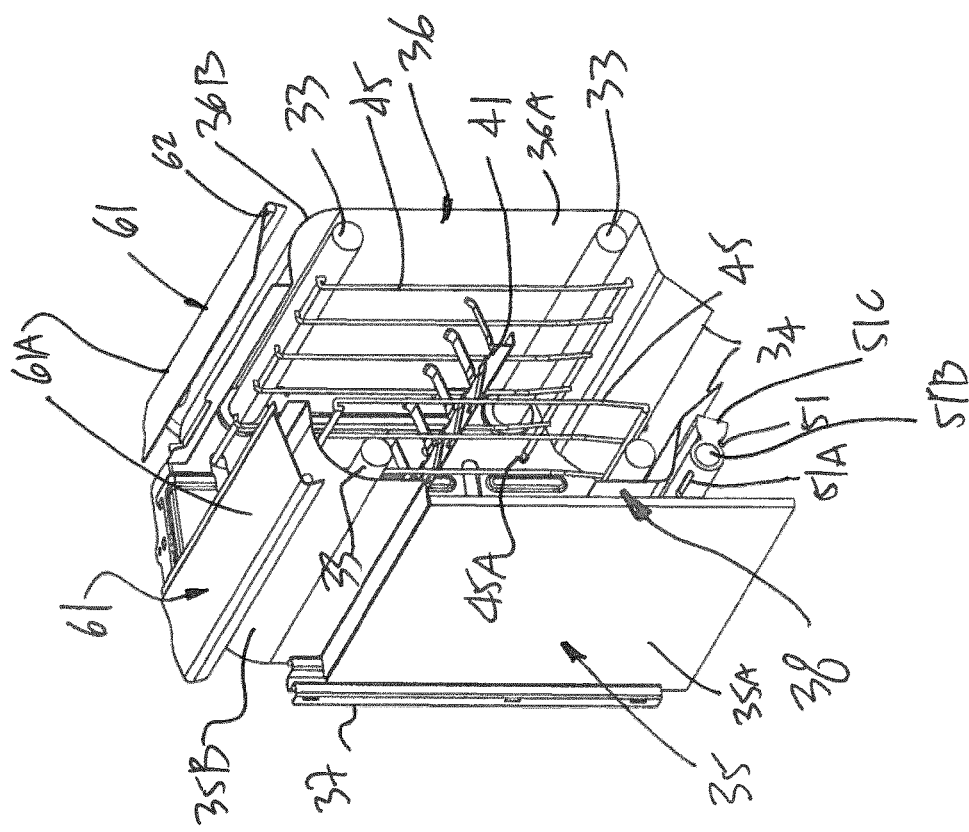
FIG. 6 is a fragmented perspective view of the toaster with the steam system of FIG. 2, showing grates of the pop-up mechanism spaced apart.

Referring to FIGS. 4 and 5, the pop-up mechanism 40 is added to the chassis 30. The pop-up mechanism 40 has a tray 41 for supporting a slice of bread (shown in FIGS. 6-8). A single tray 41 is present in the figures, but more trays 41 may be present in a multi-toast configuration for the toaster 10. The tray 41 may have any appropriate shape, such as a central member with a plurality side arms, a flat plate, a zig zag wire, etc, to allow bread crumbs to fall to the trough or bottom of the chassis 30. The tray 41 is slidingly connected at its opposed ends to the vertical slots 31A that govern the translational movement of the tray 41. At one end of the tray 41, a carriage 42 is present. The carriage 42 has a lever 42A that projects out of the casing 20, for the tray 41 to be manually brought down and bring a slice of bread into the casing 20, to initiate a toasting of the slice of bread. The carriage 42 may be operatively connected to a rod 43 that constrains the movement of the carriage 42 to a vertical movement. In an embodiment, the tray 41 may have a member projecting directly out of the casing 20 instead of the carriage 42 with the lever 42A. A coil spring 44 may be present to bias the carriage 42 upwardly to its normal rest position, in which the tray 41 is near the top of the casing 20. As is conventional, the tray 41 in this normal rest position supports the slice of bread such that it protrudes out of the casing 20, to be grasped by a user. The movement may be automated, upon a toasting cycle being completed.

The pop-up mechanism 40 may further optionally include grates 45 in the form of wire racks that center the slide of bread in the inner cavity of the toaster 10. The grates 45 are provided as a pair for each slice of bread. A bottom of each of the grates 45 is pivotally connected to the end plates 31 by a pivot 45A, while a top of each of the grates 45 has a follower 45B. The followers 45B are received in the guide slots 31B of the end plates 31. As shown in FIGS. 4 and 5, the followers 45B may be interconnected by a wire spring 46. The wire spring is of the type formed of a single wire, arranged to form a hoop, with its ends crossing each other to form the hoop. The ends of the wire spring 46 are each connected to one of the followers 45B, such that the followers 45B are biased away from one another. Therefore, by the action of the wire spring 46, the grates 45 are in the position of FIG. 7, with the grates 45 separated from one another by their maximum allowable distance. The grates 45 therefore clear the slot 25 for the bread slice to maneuver in and out of the toaster 10 without interference from the grates 45. As observed in FIG. 4, a bottom of the hoop of the wire spring 46 is adjacent to a bottom of the vertical slot 31A, in the path of the carriage 42. Therefore, the carriage 42 may come into contact with the bottom of the hoop of the wire spring 46, as in FIG. 5. In doing so, the carriage 42 applies a force on the wire spring 46. This is converted into a pull on the followers 45B, which causes the grates 45 to come together in the manner shown in FIG. 8. Accordingly, a bread slice may be generally centered in the chassis 30 by this inward movement of the grates 45, so as to be evenly spaced from the heating elements 33. As this movement is induced by the contact of the carriage 42 with the wire spring 46, the movement of the grates 45 will occur when the toast tray 41 is near the bottom of the chassis 30, and the toast is well into the chassis 30. This ensures that a standard size bread slice is not clamped by closing grates 45 when the tray 41 is moved downwardly. As the carriage 42 moves upward when the toasting and steaming process is completed, the spring 46 will return the grates 45 to the position of FIG. 7 as the carriage 42 is released from its engagement with the spring 46. It is pointed out that the system of grates 45 may not be present in the toaster 10, or that another type of mechanism or spring could be used to actuate the movement of the grates 45. For instance, a pair of static grates or toast racks may be present to ensure that the slice of bread remains generally upright and does not contact the heating elements 33.

The tray 41 and the carriage 42 may be held from moving upwardly as biased by the coil spring 44 by way of a latching mechanism, as is conventionally found in toaster, including in the toaster 10. In accordance with an embodiment, the latching mechanism includes a latch bolt, a thermostat, and/or a solenoid valve. According to another embodiment, the thermostat may be manually controlled by the knob 26. The latching mechanism releases the tray 41 and carriage 42 based on the action of the thermostat, with the coil spring 44 then acting on the tray 41 to raise the toasts.

Figure 10:
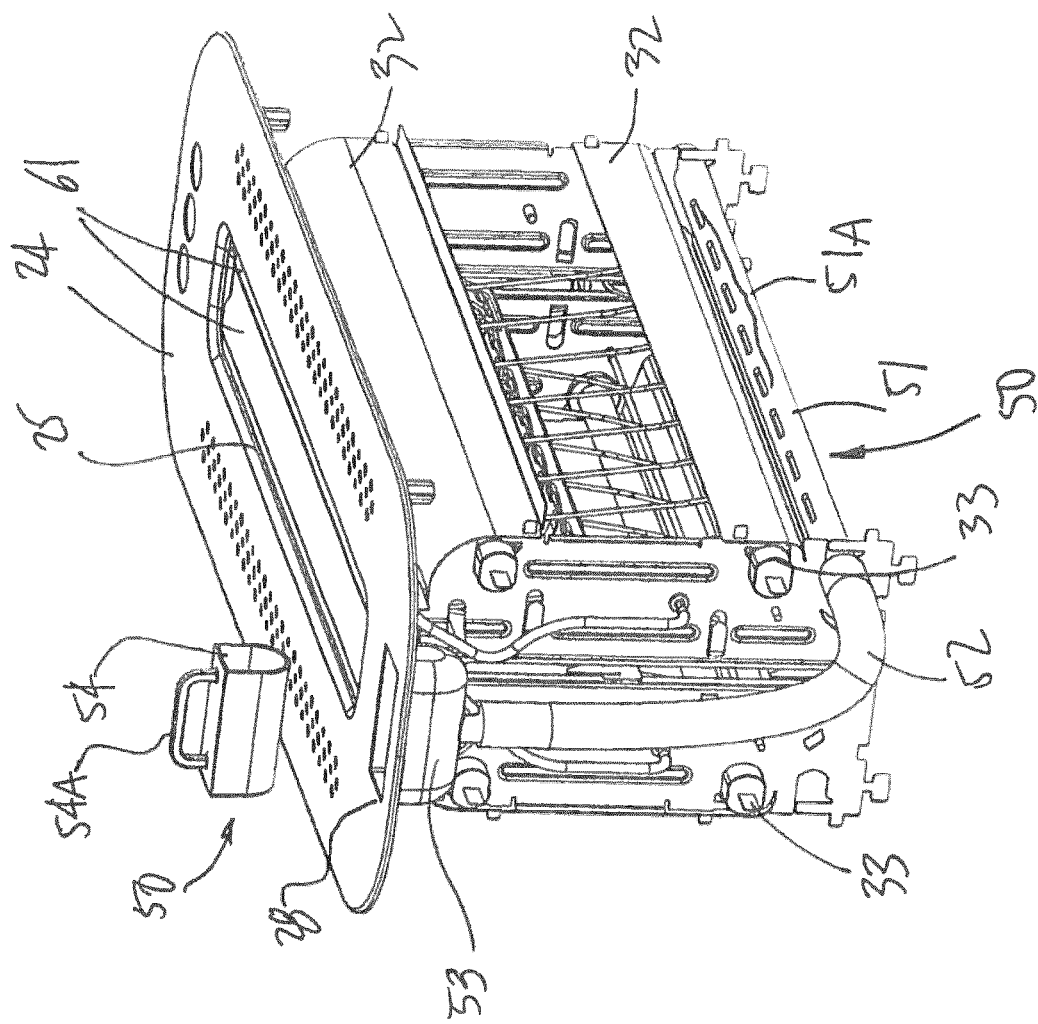
FIG. 10 is a perspective view of the toaster with the steam system of FIG. 1, with a vertical wall of the housing removed, and showing a steam system.

Referring to FIG. 10, the steam system 50 is shown in greater detail. The steam system 50 has a steam pipe 51, of the type including openings 51A in a water conduit 51B conductively connected to a heating element 51C (FIG. 6), all within the steam pipe 51. The heating element is connected to the electronic/electrical system of the toaster 10, so as to be powered to convert the water in the water conduit into steam. The powering of the steam pipe 51 may be simultaneous with the powering of the heating elements 33, or it may slightly precede it, among various options. The openings 51A in the upper portion of the steam pipe 51 allow steam to exit the steam pipe 51. In FIG. 7, it is shown that the steam pipe 51 is aligned with gap 38 or equivalent steam passages, to allow steam to fill the steaming vessel formed by the end plates 31 and the face plates 35 and 36. By being located under one of the heat shields 32, the steam pipe 51 is protected from bread crumbs.

To feed the steam pipe 51, a conduit 52 may extend from a receptacle 53 accessible via the water-refill opening 28. The receptacle 53 is located above the steam pipe 51, such that water flows by the effect of gravity to the steam pipe 51 via the conduit 52. Although not shown, various valves may be present, such as check valves, to ensure a desired volume of water is fed to the steam pipe 51. If excess water were to be supplied to the steam pipe 51, the water may overflow through the openings 51A to gather in a crumb tray/water tray in a bottom of the toaster 10.

A cup 54 may be used as part of the steam system 50 to ensure the correct volume of water is provided for each toasting/steaming process. The cup 54 is sized to receive this correct volume of water, and may be manually filled before each toasting process. Accordingly, the cup 54 is removably received in the receptacle 53 and has a handle 54A. As another example, the steam system 50 has a reservoir from which the steam pipe 51 would collect water. Additional parts may be used in such a case, including a pump that could be used as an alternative to gravity.

Figure 3:
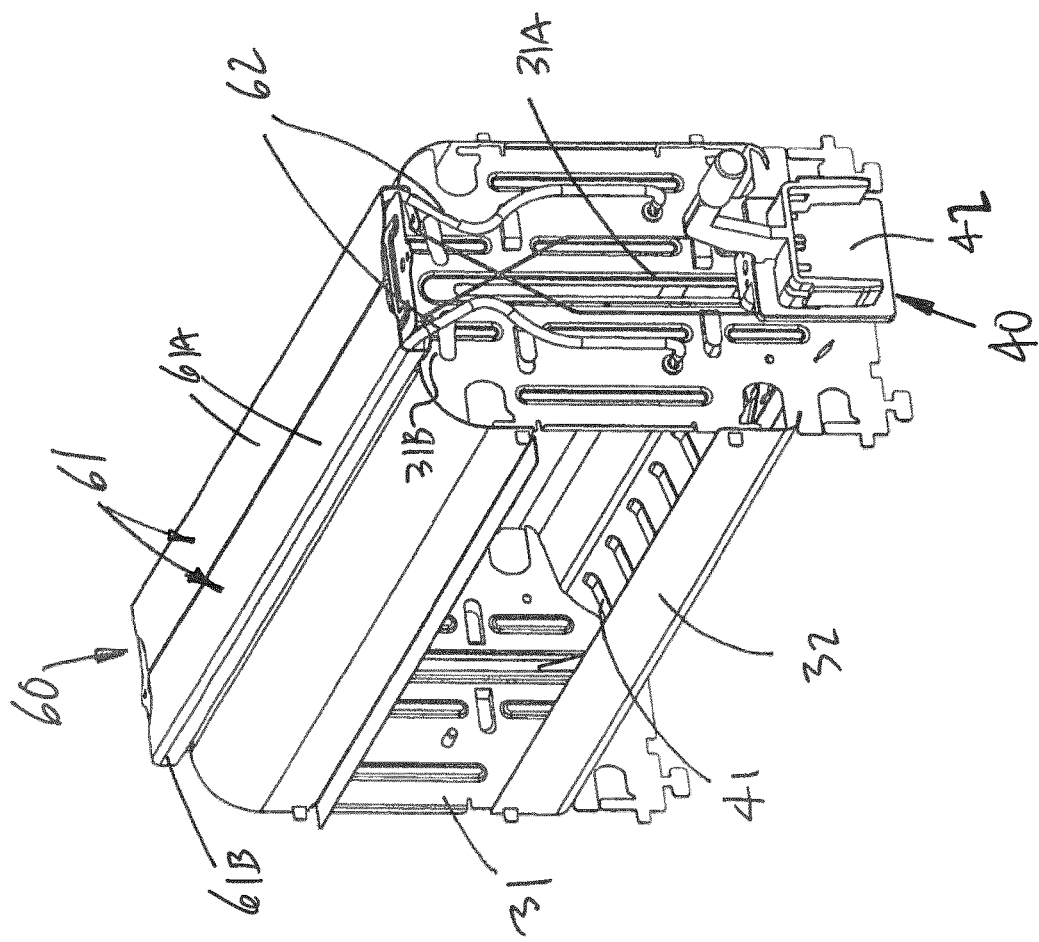
FIG. 3 is a perspective view of the toaster with the steam system of FIG. 2, with a closed configuration of the flaps.
Figure 11:
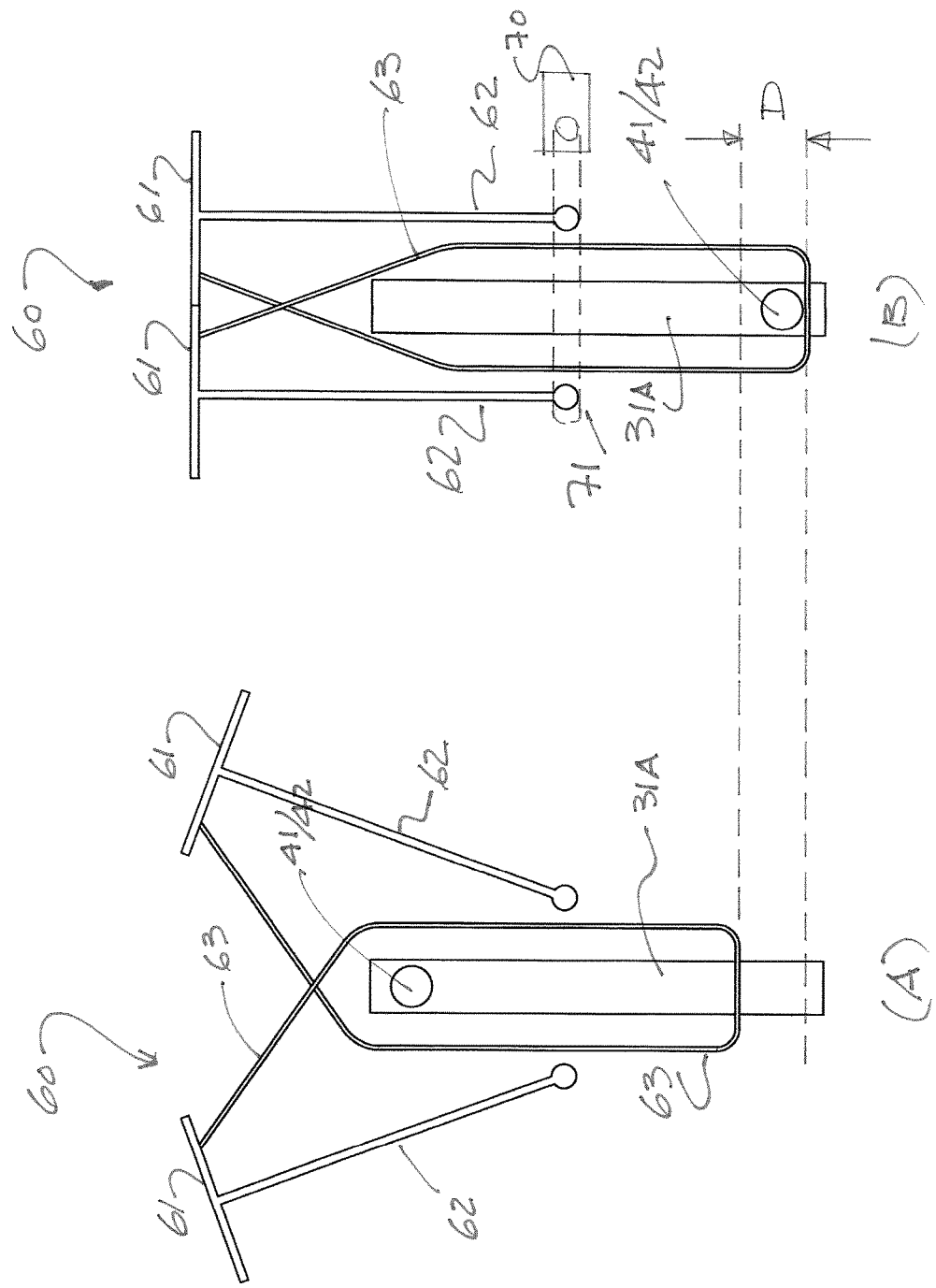
FIG. 11 is a schematic view showing an operation of the closing system of the toaster with the steam system of FIG. 1.

Referring to FIGS. 2, 3 and 11, the closing system 60 is shown in its two configurations. In the illustrated embodiment, the closing system 60 has a pair of flaps 61 that close the opening of the toaster 10 defined by the slot 25, to close off the steaming vessel and hence capture the steam therein for the bread slice(s) to absorb the steam. The flaps 61 may have complementary engaging features and/or overlapping features as shown to form a generally vapour-tight junction when connected to one another. In accordance with an embodiment, the flaps have an L-shaped cross-section, with a main panel 61A, and an elongated flange 61B. The elongated flange 61B may abut a top edge of the face plate 35 and/or 36 when the flap(s) 61 is or are closed, to ensure that steam remains in the steam vessel during the steaming/toasting process. The closing system 60 could also operate with a single flap 61, with the single flap 61 covering the full opening, or with a flap 61 being fixed. In FIGS. 2 and 11(A), the closing system 60 has the flaps 61 separated from one another, consequently clearing the passage for a bread slice to enter or exit the toaster 10. The flaps 61 could be inside or outside (and on top) of the chassis 30, in light with the slot of the chassis. In FIGS. 3 and 11(B), the closing system 60 has the flaps 61 abutting each other, to seal off the steaming vessel. The movement between the open and closed configurations is governed by a pair of arms 62 for each of the flaps 61. The arms 62 are pivotally connected to the end plates 31. For example, from a point of view facing the window 22, each arm 62 may have an inverted U-shape appearance, with its opposed ends pivotally connected to a respective one of the end plates 31. A generally horizontal part of the arm 62 may be lodged in a corner of the L-shape of the flap 61, as seen for example in FIG. 7. As an alternative, there are two arms 62 per flap 61, with none of the horizontal part described above. As yet another embodiment, one end of the flap 61 is supported by the arm 62, and the other end is supported by a rail (not shown).

Another wire spring 63, having a similar configuration as the wire spring 46, is attached at its ends to the flaps 61 or the upper arms 62, such that the wire spring 63 biases the flaps 61 away from one another. The wire spring 63 is of the type formed of a single wire, arranged to form a hoop, with its ends crossing each other to form the hoop. Therefore, by the action of the wire spring 63, the flaps 61 are in the position of FIGS. 2 and 11(A), with the flaps 61 separated from one another by their maximum allowable distance. The flaps 61 clear the slot in the chassis for the bread slice to maneuver in and out of the toaster 10 without interference from the flaps 61. As observed in FIGS. 2 and 11(A), a bottom of the hoop of the wire spring 63 is adjacent to a bottom of the vertical slot 31A, in the path of the carriage 42. Therefore, the carriage 42 may come into contact with the bottom of the hoop of the wire spring 63, as in FIGS. 3 and 11(B). In doing so, the carriage 42 applies a force on the wire spring 63, that comes downward by a distance D. This is converted into a pull on the followers flaps 61 or arms 62, which causes the flaps 61 to come together in the manner shown in FIG. 3. As this movement is induced by the contact of the carriage 42 with the wire spring 63, the movement of the flaps 61 will occur when the toast tray 41 is near the bottom of the chassis 30, and the toast is well into the chassis 30. This ensures that a standard size bread slice is not clamped by closing flaps 61 when the tray 41 is moved downwardly. For example, the distance D represents at most 40% of the height of the vertical slot 31A, or at most 40% of the vertical movement of the tray 41. In another embodiment, the value is of less than 25%. As the carriage 42 moves upward when the toasting and steaming process is completed, the spring 63 will return the flaps 61 to the position of FIG. 2 as the carriage 42 is released from its engagement with the spring 63. If there is a single moving flap 61, one end of the spring 63 may be connected to the chassis 30 (e.g., end plate 31), while the other end of the spring 63 is connected to the flap 61.

Another type of mechanism or spring could be used to actuate the movement of the spring 63. For example, as schematically shown in FIG. 11, an electric motor 70 and appropriate transmission 71 may be used to cause the movement of the flaps 61. An electric motor, such as a bidirectional motor, may be coupled to the pivot at the bottom of the arm 62, to actuate the movement of the flap(s) 61. A reduction gear box may be between the electric motor and the flaps 61. As an embodiment, a single motor actuates the movement of both of the flaps 61, if there are two flaps. As another embodiment, the motor is triggered by the downward movement of the tray 41 or related component such as the carriage 42, the lever 42A. The motor may also be connected to the electrical system and thermostat, to open the flap(s) 61 upon the end of the toasting cycle.

Referring to FIG. 12, the toaster 10 is similar to the embodiment of FIGS. 1 to 11, whereby like reference numerals represent like components. A difference resides in the plenums between the casing 20 and the chassis 30 passing through the slot 25. Consequently, the slot 25 serves as a chimney for the heat, and its sizable dimension (for the toast to exit or enter) allows heat to escape. As also observed, an additional wall(s) 21' may be present and be inward of the toaster 10. The additional walls 21' are spaced from the wall(s) 21, so as to define an air pocket acting as insulation for the wall 21 when the toasting cycle occurs. An insulating material could also be provided as an alternative to air. However, the insulating material must be capable of sustaining the heat applicable to a steaming/toasting process.

The invention claimed is:

1. A toaster with a steam system comprising:
    a casing;
    a chassis;
    at least one slot for a bread slice defined at least by the chassis;
    a pop-up mechanism within the casing and supported by the chassis, the pop-up mechanism configured for supporting a bread slice received via the at least one slot, and for raising the bread slice to project partially out of the slot at an end of a toasting/steaming process;
    at least one heating element in the casing for generating toasting heat;
    a steam system within the casing configured for producing steam and feeding the steam to a steam vessel in the chassis during the toasting/steaming process; and
    a closing system having at least one flap to close the at least one slot during the toasting/steaming process, and to open the at least one slot at completion of the toasting/steaming process.

2. The toaster with steam system according to claim 1, wherein at least one plenum is defined between the casing and the chassis with an exhaust at a top end of the casing.

3. The toaster with steam system according to claim 2, wherein both of the casing and the chassis defined the at least one slot, the at least one plenum being in fluid communication with the at least one slot in the casing, whereby the exhaust is the at least one slot.

4. The toaster with steam system according to claim 1, wherein the casing has at least one double wall with an insulating space in the double wall.

5. The toaster with steam system according to claim 1, wherein the casing includes one tubular vertical wall defining an outer surface of the casing.

6. The toaster with steam system according to claim 1, wherein the pop-up mechanism has a tray configured for supporting a bread slice received via the at least one slot, and for raising the bread slice to project partially out of the slot at an end of a toasting/steaming process.

7. The toaster with steam system according to claim 6, wherein the tray has a central elongated member with a plurality of side arms.

8. The toaster with steam system according to claim 6, further comprising a carriage located outside of the casing and connected to the tray via a vertical slot, and a lever connected to the carriage and projecting out of the casing via a vertical slot in the casing.

9. The toaster with steam system according to claim 1, wherein the at least one heating element is a cartridge.

10. The toaster with steam system according to claim 1, wherein the casing has a trough at a bottom thereof adapted to direct crumbs to a removable tray.

11. The toaster with steam system according to claim 1, wherein the casing has a pair of face plates, a top end of each face plate being curved to form a dome shape with a bread slice slot.

12. The toaster with steam system according to claim 1, wherein the steam system includes a steam pipe.

13. The toaster with steam system according to claim 12, wherein the steam pipe has an elongated water conduit conductively connected to a heating element, with openings in the water conduit.

14. The toaster with steam system according to claim 1, wherein the closing system has at least one arm pivotally connecting the flap to the chassis for movement of the at least one open configuration in which the at least one flap is away from the slot in the chassis, and a closed configuration in which the at least one flap closes the slot in the chassis.

15. The toaster with steam system according to claim 14, wherein a wire spring has a first end connected to the at least one flap and a second end connected to the chassis or to another one of the flap, the wire spring biasing the at least one flap to the open configuration.

16. The toaster with steam system according to claim 15, wherein the wire spring has a bottom portion in a vertical path of movement of the pop-up mechanism, whereby a contact between the pop-up mechanism and the bottom portion moves the at least one flap to the closed configuration.

17. The toaster with steam system according to claim 16, wherein the bottom portion is at a height of at most 40% of the vertical path of movement of the pop-up mechanism.

18. The toaster with steam system according to claim 16, wherein the bottom portion is at a height of at most 25% of the vertical path of movement of the pop-up mechanism.

19. The toaster with steam system according to claim 15, wherein the wire spring crosses over itself and forms a hoop.

20. The toaster with steam system according to claim 14, wherein the closing mechanism has two of the flaps interconnected by a spring, the spring biasing the flaps to the open configuration.

* * * * *